United States Patent [19]

Bartels et al.

[11] Patent Number: 6,089,353
[45] Date of Patent: *Jul. 18, 2000

[54] MATERIAL HANDLING VEHICLE HAVING A STABILITY SUPPORT

[75] Inventors: Alan W. Bartels, Wilton; William S. Cawiezell, Muscatine, both of Iowa

[73] Assignee: BT Prime Mover, Inc., Muscatine, Iowa

[*] Notice: This patent issued on a continued prosecution application filed under 37 CFR 1.53(d), and is subject to the twenty year patent term provisions of 35 U.S.C. 154(a)(2).

[21] Appl. No.: 09/243,179

[22] Filed: Feb. 2, 1999

Related U.S. Application Data

[62] Division of application No. 08/698,347, Aug. 16, 1996, Pat. No. 5,890,562.

[51] Int. Cl.⁷ ........................................................ B66F 9/20
[52] U.S. Cl. .......................... 187/224; 187/222; 180/326; 180/333
[58] Field of Search ..................................... 187/222, 224, 187/333; 180/326

[56] References Cited

U.S. PATENT DOCUMENTS

| Re. 13,512 | 1/1913 | Larsson . | |
|---|---|---|---|
| 2,220,450 | 11/1940 | Howell | 187/224 |
| 2,728,474 | 12/1955 | Wessel | 187/222 |
| 2,790,513 | 4/1957 | Draxler | 187/9 |
| 2,885,016 | 5/1959 | Ayers | 187/224 |
| 3,016,973 | 1/1962 | Williamson | 182/14 |
| 3,107,750 | 10/1963 | Bishop | 187/9 |
| 3,330,383 | 7/1967 | Pusztay | 187/9 |
| 3,524,522 | 8/1970 | Thomas et al. | 187/9 |
| 3,542,161 | 11/1970 | Ulinski | 187/9 |
| 3,572,484 | 3/1971 | Richins | 192/142 |
| 3,575,305 | 4/1971 | Burch et al. | 214/16.4 |
| 3,587,784 | 6/1971 | Tait | 187/9 |
| 3,595,343 | 7/1971 | Williamson | 187/9 |
| 3,606,955 | 9/1971 | Saul | 214/16.4 A |
| 3,646,890 | 3/1972 | Snyder | 104/1 |
| 3,662,861 | 5/1972 | White et al. | 187/29 R |
| 3,722,613 | 3/1973 | DePriester et al. | 180/52 |
| 3,774,726 | 11/1973 | Bredberg | 187/9 |
| 3,774,729 | 11/1973 | Winkler | 187/29 R |
| 3,787,064 | 1/1974 | DePriester et al. | 280/93 |
| 3,961,689 | 6/1976 | Leskovec | 187/95 |
| 4,037,519 | 7/1977 | Miller et al. | 91/1 |
| 4,202,565 | 5/1980 | Mosch | 280/756 |

(List continued on next page.)

FOREIGN PATENT DOCUMENTS

| 683563 | 3/1964 | Canada | 187/222 |
|---|---|---|---|
| 1143746 | 10/1957 | France | 180/326 |
| 89311 | 5/1967 | France | 187/222 |
| 1237624A | 9/1983 | Russian Federation . | |

OTHER PUBLICATIONS

Product Data Sheet for Stand–Up Rider Counterbalanced Truck Model No. RC30B by BT Prime–Mover of Muscatine, Iowa dated Nov. 1994.

(List continued on next page.)

*Primary Examiner*—Christopher P. Ellis
*Assistant Examiner*—Joe Dillon, Jr.
*Attorney, Agent, or Firm*—Leydig, Voit & Mayer, Ltd.

[57] ABSTRACT

A material handling vehicle for transporting loads includes a vehicle body and a control console connected to the vehicle body in a first position. The control console can be moved to a second position on the vehicle body by a user. The vehicle may include various devices for positioning the control console with respect to the body. For example, the devices may include separate post openings, a slot, a track, or a pivoting arm. In addition, the control console may include a stability support for the operator and various controls for operating the vehicle. The operator is able to maintain stability by holding the stability support with his or her hand. Furthermore, the operator does not need to remove his or her hand from the stability support in order to operate the various controls. The controls may be mounted on the stability support or may be located in relatively close proximity to the stability support.

11 Claims, 12 Drawing Sheets

U.S. PATENT DOCUMENTS

| | | | |
|---|---|---|---|
| 4,252,217 | 2/1981 | Benjamin | 187/9 R |
| 4,280,205 | 7/1981 | Dammeyer | 367/119 |
| 4,287,966 | 9/1981 | Frees | 187/224 |
| 4,311,212 | 1/1982 | Simpson | 187/29 A |
| 4,322,712 | 3/1982 | Yoshida | 340/19 R |
| 4,336,860 | 6/1982 | Noller et al. | 180/273 |
| 4,378,059 | 3/1983 | Hatakeyama et al. | 187/29 R |
| 4,513,782 | 4/1985 | Contarese et al. | 137/625.63 |
| 4,552,250 | 11/1985 | Luebrecht | 187/9 E |
| 4,593,791 | 6/1986 | Matthews | 187/9 E |
| 4,594,570 | 6/1986 | Tweed, Jr. et al. | 340/21 |
| 4,716,980 | 1/1988 | Butler | 180/19.2 |
| 4,755,100 | 7/1988 | Schultz et al. | 414/635 |
| 4,782,920 | 11/1988 | Gaibler et al. | 187/9 R |
| 4,807,715 | 2/1989 | Nagashima et al. | 180/326 |
| 4,864,208 | 9/1989 | Schroder | 318/603 |
| 4,880,082 | 11/1989 | Kähkipuro et al. | 187/134 |
| 4,915,281 | 4/1990 | Berger et al. | 226/112 |
| 5,011,358 | 4/1991 | Andersen et al. | 414/273 |
| 5,022,496 | 6/1991 | Klopfleisch et al. | 187/9 E |
| 5,040,639 | 8/1991 | Watanabe et al. | 187/111 |
| 5,054,599 | 10/1991 | Marcott | 192/85 R |
| 5,170,863 | 12/1992 | Deyroy | 187/98 |
| 5,243,154 | 9/1993 | Tomisawa et al. | 187/111 |
| 5,341,895 | 8/1994 | Grinberg et al. | 180/326 |
| 5,373,121 | 12/1994 | Nagel | 187/275 |
| 5,409,079 | 4/1995 | Strong et al. | 180/326 |
| 5,409,080 | 4/1995 | Templeton et al. | 180/326 |
| 5,839,542 | 11/1998 | Seng et al. | 187/222 |

OTHER PUBLICATIONS

Product Data Sheet for Stand–Up Rider Counterbalanced Truck Model No. RC40B by BT Prime–Mover of Muscatine, Iowa dated Nov. 1994.

Product Data Sheet for Electric Counterbalanced Order Selector (12 or 24 Volt) Model No. OE15C by BT Prime–Mover of Muscatine, Iowa dated Jul. 1993.

Product Data Sheet for Electric Reach Truck 24–Volt & 36–Volt Model No. RR30 by BT Prime–Mover of Muscatine, Iowa dated Nov. 1994.

Product Data Sheet for Electric Reach Truck 24–Volt & 36–Volt Model No. RR34 by BT Prime–Mover of Muscatine, Iowa dated Mar. 1995.

Product Data Sheet for Electric Reach Truck Model No. RR45 by BT Prime–Mover of Muscatine, Iowa dated Oct. 1994.

Product Data Sheet for Electric Double Reach Truck Model No. RR45 by BT Prime–Mover of Muscatine, Iowa dated Mar. 1995.

Product Data Sheet for Electric Reach Truck Model Nos. RRB2, RRE2, RRB3, RRE3 Reflex by BT Prime–Mover of Muscatine, Iowa dated Jun. 1995.

Product Data Sheet for Electric Reach Truck Model Nos. RRB5, RRE5, RRB6, RRE6 Reflex by BT Prime–Mover of Muscatine, Iowa dated Jun. 1995.

Product Data Sheet for Electric Reach Truck Model Nos. RRB7, RRE7, RRB8, RRE8 Reflex by BT Prime–Mover of Muscatine, Iowa dated Jun. 1995.

Product Data Sheet for Compact Electric Reach Truck Model Nos. RRN2, RRN3 Reflex by BT Prime–Mover of Muscatine, Iowa dated Nov. 1995.

Product Data Sheet for Electric Rider Straddle Truck Model No. RS40 by BT Prime–Mover of Muscatine, Iowa dated Jun. 1994.

Product Data Sheet for Electric Rider Straddle Truck Model No. RS50 by BT Prime–Mover of Muscatine, Iowa dated Jun. 1994.

Product Data Sheet for Walkie Electric Counterbalanced Stacker Model No. SC20 by BT Prime–Mover of Muscatine, Iowa dated Nov. 1994.

Product Data Sheet for Walkie Electric Counterbalanced Stacker Model No. SC30 by BT Prime–Mover of Muscatine, Iowa dated Mar. 1995.

Product Data Sheet for Electric Counterbalanced Walkie Stacker Model No. SC40 by BT Prime–Mover of Muscatine, Iowa dated Apr. 1990.

Product Data Sheet for Electric Walkie Reach Truck Model No. SR30 by BT Prime–Mover of Muscatine, Iowa dated Oct. 1995.

Product Data Sheet for Electric Walkie Straddle Stacker Model No. SN20 by BT Prime–Mover of Muscatine, Iowa dated Mar. 1995.

Product Data Sheet for Electric Walkie Straddle Stacker Model No. SN30 by BT Prime–Mover of Muscatine, Iowa dated Aug. 1994.

Product Data Sheet for Electric Walkie Straddle Stacker Model No. SN40 by BT Prime–Mover of Muscatine, Iowa dated Oct. 1995.

Product Data Sheet for Electric Walkie Adjustable Straddle Stacker Model Nos. WSX20, WSX25 by BT Prime–Mover of Muscatine, Iowa dated Sep. 1995.

Product Data Sheet for High Lifters Model Nos. BT HLE1000/HL1000 by BT Prime–Mover of Muscatine, Iowa dated Aug. 1994.

Product Data Sheet for Electric Center–Control Tow Tractor 24–Volt Model No. TMX by BT Prime–Mover of Muscatine, Iowa dated Mar. 1995.

Product Data Sheet for Electric Center–Control Low–Lift Pallet Truck 24–Volt Model No. CMX60, CMX80 by BT Prime–Mover of Muscatine, Iowa dated Mar. 1995.

Product Data Sheet for Electric Low–Lift Pallet Truck 24–Volt Model No. HMX65, HMX80 by BT Prime–Mover of Muscatine, Iowa dated Mar. 1995.

Product Data Sheet for Electric Low Lift Pallet Truck 12–Volt Model No. PMX by BT Prime–Mover of Muscatine, Iowa dated Mar. 1995.

Product Data Sheet for Electric Low Lift Pallet Truck 24–Volt Model No. PMX by BT Prime–Mover of Muscatine, Iowa dated Oct. 1995.

Product Data Sheet for Electric Walkie–Rider Low Lift Pallet Truck 24–Volt Model No. QMX by BT Prime–Mover of Muscatine, Iowa dated Oct. 1995.

Product Data Sheet for Electric Low Lift Pallet Truck 12–Volt Model No. RMX50 by BT Prime–Mover of Muscatine, Iowa dated Nov. 1994.

Product Data Sheet for Electric Low Lift Pallet Truck 24–Volt Model Nos. RMX65, RMX80 by BT Prime–Mover of Muscatine, Iowa dated Oct. 1993.

Product Data Sheet for Electric Counterbalanced End Control Rider Truck Model No. RC 40 by BT Prime–Mover of Muscatine, Iowa dated Jun. 1989.

Product Data Sheet for Reflex The Intelligent Reach Truck by Prime Mover of Muscatine, Iowa dated 1995.

Product Data Sheet for the Crown Line by Crown, New Bremen, Ohio dated Feb., 1981.

Product Data Sheet for Series RR the Crown Alternative by Crown, New Bremen, Ohio dated approx. 1980.

Product Data Sheet for Series RR Rider Reach trucks, 25RR, 35RR—24 Volts by Crown, New Bremen, Ohio dated approx. 1981.
Product Data Sheet for Series SC Lift Trucks by Crown, New Bremen, Ohio dated Oct., 1980.
Product Data Sheet for Series RC Lift Trucks by Crown, New Bremen, Ohio dated Aug., 1981.
Product Data Sheet for Model SP48 Stockpickers by Crown, New Bremen, Ohio dated Oct., 1979.
Product Data Sheet for Model SP42 Stockpickers by Crown, New Bremen, Ohio dated Sep., 1980.
Product Data Sheet for Model SP36 Stockpickers by Crown, New Bremen, Ohio dated May, 1981.
Product Data Sheet for Series WR Heavy Duty Walkie Reach Stackers by Crown, New Bremen, Ohio dated approx. 1981.
Product Data Sheet for Series WB Counterbalanced Walkies by Crown, New Bremen, Ohio dated Aug., 1981.
Product Data Sheet for Series M. Walkie Stackers by Crown, New Bremen, Ohio dated approx. 1981.
Product Data Sheet for Series B Power Lift Stackers by Crown, New Bremen, Ohio dated Aug., 1978.
Product Data Sheet for Series H Hand Hydraulic Stackers by Crown, New Bremen, Ohio dated May, 1978.
Product Data Sheet for Series PR Rider Pallet Trucks by Crown, New Bremen, Ohio dated Sep., 1980.
Product Data Sheet for 30 SSR Slip Sheet Rider by Crown, New Bremen, Ohio dated Jul., 1980.
Product Data Sheet for PC Center Control Pallet Trucks by Crown, New Bremen, Ohio dated Aug., 1981.
Product Data Sheet for PE End Control Pallet Trucks by Crown, New Bremen, Ohio dated Aug., 1981.
Product Data Sheet for Series GPW Walkie Pallet Trucks by Crown, New Bremen, Ohio dated Oct., 1980.
Product Data Sheet for Series PTH by Crown, New Bramen, Ohio dated Sep., 1980.
Product Data Sheet for Series T Tow Tractors by Crown, New Bremen, Ohio dated Nov., 1979.
Product Data Sheet for Series RR Rider Reach Trucks, 25RR, 35RR—36 Volts by Crown of New Bremen, Ohio dated Sep., 1979.
Product Data Sheet for Series RR Rider Reach Trucks, 45RR—36 Volts by Crown of New Bremen, Ohio dated Apr., 1980.
Product Data Sheet for Double Reach Trucks RD 3000 Series by Crown of New Bremen, Ohio dated Mar., 1993.
Product Data Sheet for Rider Reach Trucks RR 3000 Series by Crown of New Bremen, Ohio dated Mar., 1993.
Product Data Sheet for 500 Series, 36 Volt Narrow Aisle Reach Trucks NP500 35/45 by Clark Industrial Truck Division, Georgetown, KY dated 1978.
Product Data Sheet for NP 500 Narrow Aisle Reach Trucks by Clark Equipment Industrial Truck Division, Battle Creek, Michigan dated Oct. 1973.
Product Data Sheet for Clark Narrow Aisle NP500 25 D by Clark Industrial Truck Divsion, Georgetown, KY dated Jun. 1979.
Product Data Sheet for Clark 300 Series 24–Volt Narrow Aisle Straddle and Reach Trucks NS 300 20/30/40, NP 300 20/30/40 by Clark Industrial Truck Division, Georgetown, KY dated 1978.
Product Data Sheet for Clark NP 300 20/30/40 24 Volt Narrow Aisle Reach Truck by Clark Industrial Truck Division, Georgetown, KY dated Oct. 1977.

Product Data Sheet for NPR Series Electric Narrow Aisle Reach Trucks NPR 17/20/22, 24/36 Volt by Clark Machinery Information Division of K–III Directory Corp. dated Dec., 1994.
Product Data Sheet for NP Series NP 15/20/22 Reach NP 15D Double Reach by Clark dated Nov., 1990.
Product Data Sheet for Model 31 by The Raymond Corporation, Greene, N.Y. dated Jun., 1978.
Product Data Sheet for Reach–Fork Trucks by The Raymond Corporation, Greene, N.Y. dated 1977.
Product Data Sheet for EASi Reach–Fork Trucks By Raymond dated Feb., 1995.
Product Data Sheet for EASi2 Reach–Fork Truck by The Raymond Corporation, Greene, N.Y. dated 1991.
Product Data Sheet for Intellidrive2 by The Raymond Corporation, Greene, N.Y. dated Jun., 1990.
Product Data Sheet for Toyota Electric Reach Trucks 900–3, 000 kg, by Toyota, at least before Aug. 16, 1995.
Product Data Sheet for Narrow Aisle Reach Trucks by Caterpillar dated Jan., 1993.
Product Data Sheet for NRR30/35/40 by Caterpillar dated May, 1994.
Product Data Sheet for NRR30P/35P/40P/45P by Caterpillar dated Dec., 1992.
Product Data Sheet for NRDR25 24 Volt Double–Reach Trucks by Caterpillar dated Sep., 1993.
Product Data Sheet for NRDR25P/NRDR30P Double–Reach Trucks by Caterpillar dated Jan., 1993.
Product Data Sheet for NSR30/NSR 40 by Caterpillar dated Sep., 1993.
Product Data Sheet for NSR30P/NSR40P by Caterpillar dated Jun., 1993.
Product Data Sheet for Nissan Olympian OR Series Rider Reach Trucks by Nissan Forklift Corporation, Marengo, IL dated Sep., 1995.
Product Data Sheet for RRT Series Rider Reach Trucks by Barrett Industrial Trucks, Marengo, IL dated Jul. 1991 and May 1992.
Product Data Sheet for Narrow Aisle 3500 and 4000 lb Capacity Straddle Trucks, Models NS035A, NS 040A by Yale Industrial Trucks, Flemington, N.J., dated Apr., 1992.
Product Data Sheet for Narrow Aisle 3500, 4000, 4500 lb Capacity Reach Trucks, Models NR035AC, NR040AC, NR045AC by Yale Industrial Trucks, Flemington, N.J., dated 1994.
Product Data Sheet for Narrow Aisle 3500, 4000 and 45000 lb Capacity Reach Trucks, Models NR035A, NR040A, NR045A by Yale Industrial Trucks dated Feb., 1993.
Product Data Sheet for Narrow Aisle 3500 and 4500 lb Capacity High Lift Reach trucks, Models NR035B, NRO45B by Yale Industrial Trucks dated 1991.
Product Data Sheet for Narrow Aisle 3000 lb Capacity High Lift Double Reach Truck, Model NDR030B by Yale Industrial Trucks dated Apr. 1992.
Product Data Sheet for Narrow Aisle 3000 lb Capacity Narrow Chassis Double Reach Truck Model 030A by Yale Industrial Trucks dated 1991.
Product Data Sheet for Yale NE Narrow Aisle Extend Trucks Stand–Up End Control—24 or 36 Volts, 2000 and 3000 Pound Capacities by Eaton Materials Handling of Palo Also, CA dated Apr., 1975.
Product Data Sheet for Yale Narrow Aisle Double Extend Industrial Truck—NDE 025, 2500 lb Rated Capacity at full extension by Eaton Materials Handling of Palo Alto, CA dated Apr., 1976.

Product Data Sheet for Yale NE Narrow Aisle Extend Trucks 2000, 3000, 4000 pound capacities by Eaton Materials Handling of Palo Alto, CA dated Apr., 1975.

Product Data Sheet for Yale NE Narrow Aisle Extend trucks Stand–Up End Control—24 or 36 Volts 4000 Pounds Capacity by Eaton Materials Handling of Palo Alto, CA dated Mar., 1978.

Photograph of Yale Industrial Truck dated 1978.

Product Data Sheet for NYK Electric Stand Up Counterbalanced/Reach FBR/FBRW Series by Forklift Trucks of Houston, TX dated Oct. 1990.

Product Data Sheet for NYK Electric Reach Truck, FER 3000LB by Mitsubishi International Corp. of Elk Grove Village, IL dated 1981.

Product Data Sheet for NYK Electric Reach Truck, FER 3000LA by Mitsubishi International Corp. of Elk Grove Village, IL dated 1980.

Product Data Sheet for NYK Electric Reach Truck Model FER 4000LA by Mitsubishi international Corporation of Elk Grove Village, IL dated 1980.

Product Data Sheet for NYK Electric Reach Truck, Model FER 4000LB by NYK Nippon Yu;soki Co., Ltd. of Tokyo, Japan dated 1982.

Product Data Sheet for NYK Battery Reach Truck, Model FER 4000L by NYK Nippon Yusoki Co., Ltd. of Tokyo, Japan, at least before Aug. 16, 1995.

Product Data Sheet for Baker Moto–True High–Lift Rider–Reach Trucks by Baker Material Handling Corporation of Cleveland, Ohio dated Mar., 1982.

Product Data Sheet for Baker Moto–Truc Narrow Aisle Walkie High Lift Reach Trucks, X–Tend–W 025D/030/040 by Baker Material Handling Corporation of Cleveland, Ohio dated Jul., 1982.

Product Data Sheet for Baker Moto–Truc Narrow Aisle Rider High Lift Reach trucks, X–Tend–R 030D/035/045 by Baker Mateiral Handling Corporation of Cleveland, Ohio dated Jul., 1982.

Product Data Sheet for Otis Moto–Truc Series Walkie & Rider by Otis Elevator Company of Cleveland, Ohio dated Dec., 1972.

Product Data Sheet for N30FR Reach Trucks by Hyster Company of Brunswick, Georgia dated Feb., 1993.

Product Data Sheet for N40–45FR Reach Trucks by Hyster Company of Brunswick, Georgia dated Mar., 1993.

Two photographs of Hyster Truck, at least before Aug. 16, 1995.

Product Data Sheet for NYK Battery Reach Truck, Model FER 3000L by NYK Nippon Yusaki Co. Ltd. of Tokyo, Japan, at least before Aug. 16, 1995.

Product Data Sheet for Application Guide ACNR–NS 30/40 Narrow Aisle Straddle and Reach Trucks by Kalmar AC Handling Systems, Inc. of Columbus, Ohio, dated, at least before Aug. 16, 1995.

Product Data Sheet for ACNR 30/40 Narrow Aisle Reach Trucks by Kalmar AC Handling Systems, Inc. of Columbus, Ohio, at least before Aug. 16, 1995.

Specification Sheet for RC40 Electric Conterbalanced End Control Rider Truck, The Prime–Mover Company, approximately Dec. 1987.

MATERIAL HANDLING VEHICLE HAVING A STABILITY SUPPORT

This is a divisional application of application Ser. No. 08/698,347, filed Aug. 16, 1996, which issued as U.S. Pat. No. 5,890,562.

FIELD OF THE INVENTION

The invention relates to material handling vehicles and more particularly to control systems for material handling vehicles.

BACKGROUND OF THE INVENTION

Material handling vehicles are used to transport items from one location to another location. For example, items may be transported from one location in a factory to another location in a factory. In another example, material handling vehicles can be used in a warehouse to store or retrieve various items. In some material handling vehicles, the operator stands while operating the vehicle. In other material handling vehicles, the operator sits while operating the vehicle.

The operator has several controls which are used to control the operation of the vehicle. For example, the controls may control the speed and direction of the vehicle and also the operation of the lift portion. Some manufacturers of material handling vehicles locate the controls in the forward position. Other manufacturers locate the controls in the side position. Furthermore, other manufacturers position the controls so that they are at an angle between the forward position and the side position. The customer must decide at the time the vehicle is purchased the position of the controls. The customer is not able to change the position of the controls after the vehicle has been manufactured and delivered to the customer.

For example, if a customer had material handling vehicles with the controls in the forward position, the customer would not be able to change the position of the controls to the side position. The customer would need to determine the position of the controls at the time the vehicle was ordered from the manufacturer. In addition, if the first customer wished to sell its used vehicles with the controls in the forward position to a second customer, the number of perspective purchasers would be limited to customers who were only interested in vehicles with the controls in the forward position. Therefore, it would be advantageous if the customer could change the position of the controls.

Similarly, if a manufacturer only sells vehicles with the controls in the forward position, then the manufacturer would not be able to sell vehicles to customers who wished the controls to be in the side position or the angled position. Also, if a manufacturer offered one model of a vehicle with the controls in the forward position and another model with the controls in the side position, the manufacturer may need additional parts and/or assembly operations for each model. In addition, the manufacturer or distributor may need to have additional inventory in order to stock both models. Furthermore, as noted above, the customer would need to determine the model (i.e., the position of the controls) at the time the vehicle was ordered. Thus, it would be advantageous if the manufacturer and/or distributor could have one model with multiple positions for the controls.

As noted above, the operator must use his or her hands to operate the controls for the vehicle. These controls move with respect to the control console. Thus, if the operator is using both hands to operate the controls, the operator does not have a fixed surface to hold in order to maintain his or her stability in the vehicle. This situation is more important in the vehicles where the operator stands to operate the vehicle. Thus, it would be advantageous if the control console provided a fixed surface for the operator to hold to maintain stability and which also allowed the operator to manipulate the controls.

OBJECTS OF THE INVENTION

A general object of the present invention is to provide a material handling vehicle. Another object of the invention is to provide a material handling vehicle with a control console which can be located in different positions by the user. A further object of the invention is a control console which can be located in any position between the left side position and the right side position by the user. Another object is to provide a control console which can be located in any position between the forward position and the side position by the user. An additional object of the invention is a control console which can be located in the forward position, the side position or an intermediate position by the user.

Another object of the invention is to provide a material handling vehicle with a control console which provides stability support for the operator. A further object of the invention is to provide an operator support which permits the user to hold the support for stability and also permits the user to operate the controls while holding the support. An additional object of the invention is to provide a support which does not move (i.e. fixed) relative to the control console. Another object of the invention is to provide a support which includes controls for operating the vehicle.

Another object of the invention is to provide a material handling vehicle which reduces the manufacturing and assembly costs.

Other objects and advantages of the invention will become apparent upon reading the following description and upon reference to the drawings.

SUMMARY OF THE INVENTION

The material handling vehicle may include a body and a lifting portion. The body may include an operator area and a control console which is positioned on the body. The operator is positioned in the operator area and uses the control console to operate the vehicle.

In one embodiment, the control console may be attached to a mounting post. The body includes four post openings and each of the post openings is able to accommodate the mounting post and the attached control console. Thus, the operator or maintenance person is able to remove the mounting post and the attached control console from one of the post openings and insert the post and the attached control console into another post opening to change the position of the control console.

The body of the material handling vehicle may include other mechanisms for positioning the control console with respect to the body. In a second embodiment, the body includes a slot for the mounting post and the attached control console. The mounting post engages the slot and the control console may be located in any position along the slot. In a third embodiment, the body includes a track or bar for positioning the control console with respect to the body. The control console engages the track and the control console may be located in any position along the track. In a fourth embodiment, the body includes a pivoting arm for positioning the control console with respect to the body. The control console engages the pivoting arm and the control console may be located in any position within the rotation of the pivoting arm. Thus, the invention provides a material handling vehicle with a control console which can be located in a different position by the user.

The control console may include a stability support for the operator and various controls for operating the vehicle. The operator is able to maintain stability by holding the stability support with his or her hand. Furthermore, the operator does not need to remove his or her hand from the stability support in order to operate the various switches. For example, switches may be mounted on the stability support. Therefore, the operator can manipulate these switches using his or her thumb without removing his or her hand from the stability support. Similarly, switches may also be located in relatively close proximity to the stability support. Consequently, the operator can manipulate these switches with his or her fingers without removing his or her hand from the stability support. Thus, the invention provides a control console which provides a stability support and also permits the user to operate the controls while holding the support.

DESCRIPTION OF THE INVENTION

Figure 1:
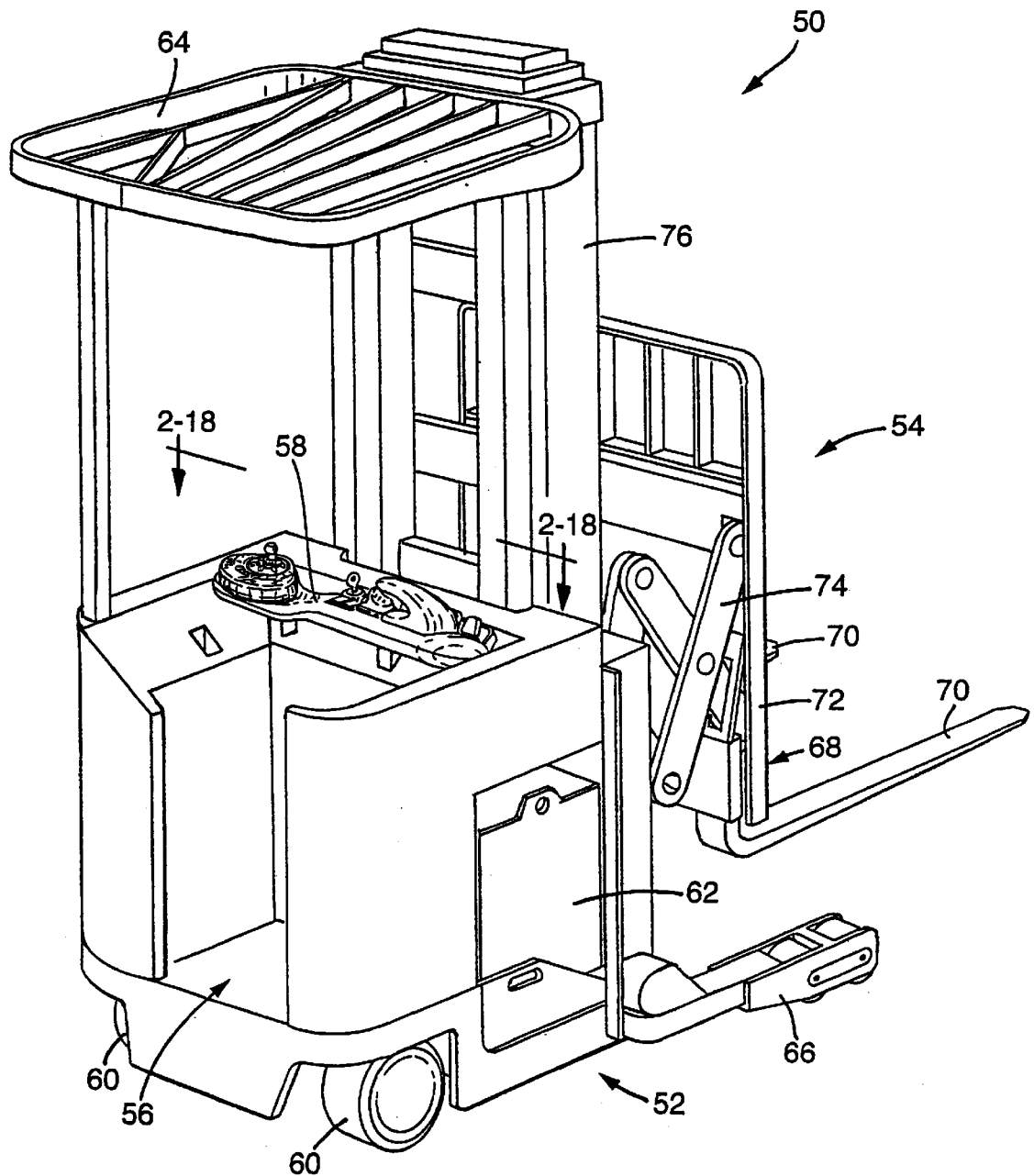
FIG. 1 is a left rear perspective view of a material handling vehicle in accordance with the teachings of the invention.

A material handling vehicle 50 constructed in accordance with the teachings of the invention is illustrated in FIG. 1. The material handling vehicle may include a body 52 and a lifting portion 54. The body 52 may include an operator area 56 and a control console 58 which is positioned on the body 52. The body may also include a drive system which includes wheels 60 and a hydraulic system to perform various functions on the vehicle. The systems would also be operatively connected to the control console 58. In one embodiment, an electric drive system and an electro-hydraulic system are operatively connected to a battery 62. In other embodiments, the systems could be powered and/or controlled by engines using propane, gasoline, diesel, compressed natural gas or other fuels. The body may also include an overhead guard 64 and outrigger supports 66.

The lifting mechanism 54 may include a fork carriage 68 which may include forks 70 and a load backrest 72. The forks 70 and the backrest 72 engage the item to be transported. The fork carriage may include a tilt feature which permits the fork carriage to tilt forward and backward. In addition, the fork carriage may include a side shift feature which permits the fork carriage to move sideways to the left or to the right. In this embodiment the fork carriage 68 is connected to a reach mechanism 74 which allows the forks 70 and backrest 72 to extend outward to retrieve or store the item. The reach mechanism 74 is connected to the mast 76 which permits the fork carriage to be moved in an upward and downward direction. In some embodiments, the reach mechanism 74 is not necessary and the fork carriage 68 would be connected to the mast 76.

Figure 2:
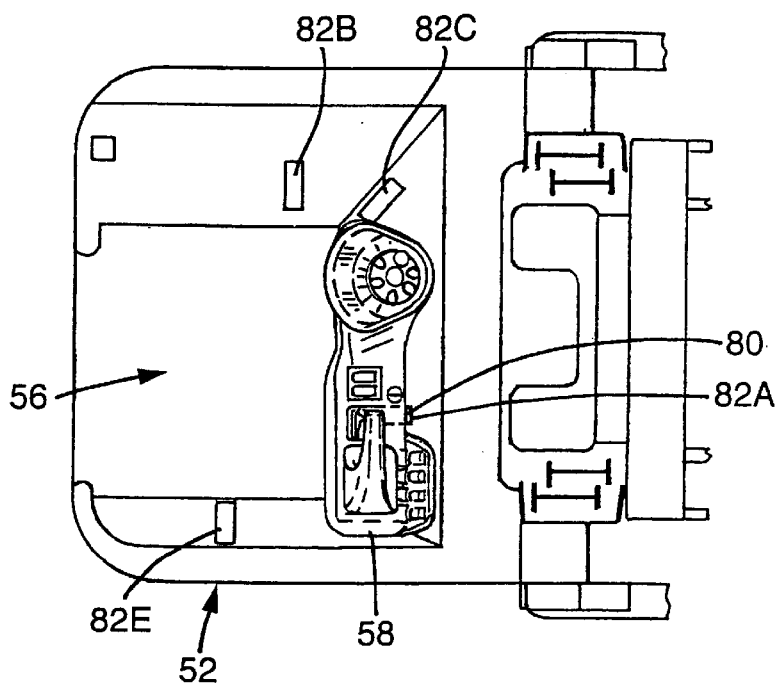
FIG. 2 is a partial cross-sectional view taken along line 2—2 of FIG. 1 showing the control console in the forward position.

Referring to FIGS. 1 and 2, the operator stands in the operator area 56 and uses the control console 58 to operate the vehicle 50. In other embodiments, the operator may be seated and uses a control console to operate the vehicle. As illustrated in FIGS. 1 and 2, the control console 58 is mounted in the forward position and the operator would stand facing the control console 58.

Figure 3:
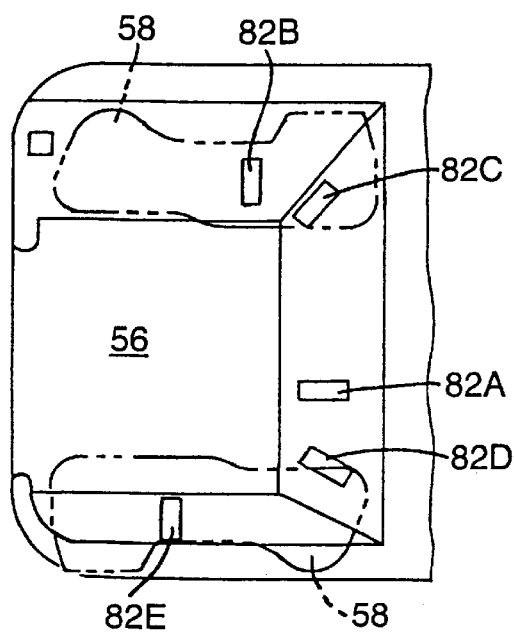
FIG. 3 is another view of the embodiment shown in FIG. 2 illustrating the left side position and the right side position for the control console.
Figure 4:
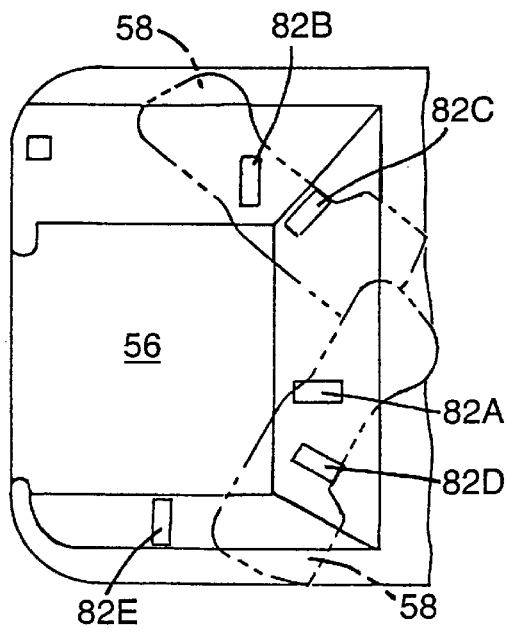
FIG. 4 is another view of the embodiment shown in FIGS. 2 and 3 illustrating other positions for the control console.
Figure 5:
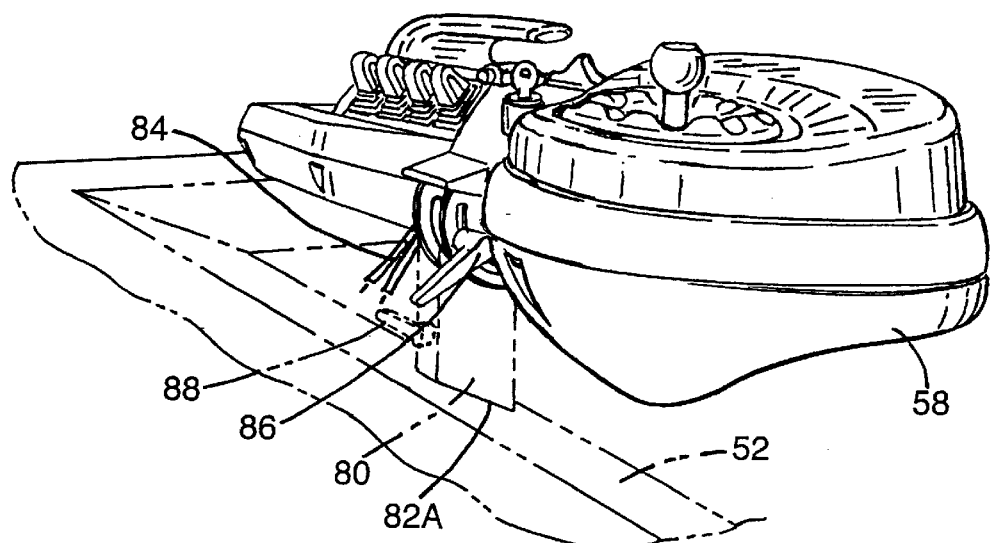
FIG. 5 is a left front perspective view of the control console.

Referring to FIG. 5, the control console 58 may be attached to a mounting post 80 which is removably connected to the body 56. The body 52 includes openings 82A, 82B, 82C, 82D, 82E to receive the mounting post 80 as shown in FIGS. 2–5. As illustrated in FIG. 5, the control console and mounting post may include an angle adjustment mechanism 86 which permits the operator to adjust the angle of the control console 58. In addition, the mounting post 80 may include a height adjustment mechanism 88 which permits the operator to adjust the height of the control console 58.

Referring to FIG. 2, the body 52 includes five post openings 82A, 82B, 82C, 82D, 82E. Each of the post openings 82A–82E are able to accommodate the mounting post 80 and the attached control console 58. Thus, the operator or maintenance person is able to remove the mounting post 80 and the attached control console from one of the post openings and insert the post 80 and the attached control console 58 into another post opening to change the position of the control console. For example, in FIG. 2 the control console 58 is in the forward position. However, the user could move the control console 58 to the left side position by inserting the mounting post 80 and the attached control console 58 into opening 82B as shown in FIG. 3. Similarly, the control console 58 could be located in the angled position by inserting the mounting post 80 and the attached control console 58 into post opening 82C or post opening 82D as shown in FIG. 4. The control console 58 could be located in the right side position by moving the mounting post 80 and the attached control console 58 to opening 82E. Although this embodiment shows five post openings, other embodiments could include two, three, four, six or more post openings as desired. Thus, the operator or the maintenance person is able to move the control console to the desired position.

Electrical wires 84 extend from the control console 58 to the body to connect the controls with the various devices within the body. The wires 84 have sufficient length so that the mounting post 80 and control console 58 can be located in the desired positions.

In another embodiment, the wires 84 are disposed inside or outside the mounting post 80. The wires are then connected to contacts on the mounting post 80. In addition, the openings 82A–82E would include mating contacts for the contacts on the mounting post. For example, the wires 84 may be disposed within the mounting post 80 and the contacts may be located at the bottom of the mounting post. In addition, the mating contacts may be located near the bottom of the openings 82A–82E. The electrical connections would be completed when the user inserts the mounting post so that the contacts engage the mating contacts. In addition, the user can remove the mounting post to another opening and the electrical connections would be completed when the contacts engage the mating contacts in the other opening. Thus, the location of the control console is not limited by the length or location of the wires. In addition, if the wires are concealed, then the possibility of the wires becoming entangled or damaged is reduced.

Figure 6:
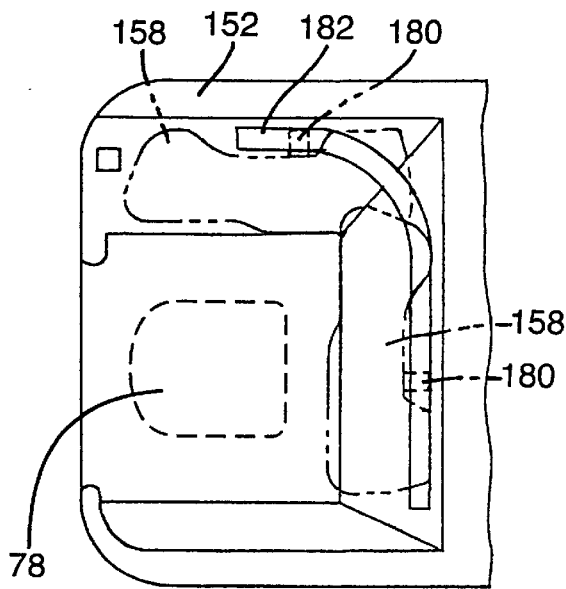
FIG. 6 is a partial cross-sectional view of the material handling vehicle taken along line 6—6 of FIG. 1 showing a second embodiment for attaching the control console to the vehicle body and showing the forward position and the side position for the control console.
Figure 7:
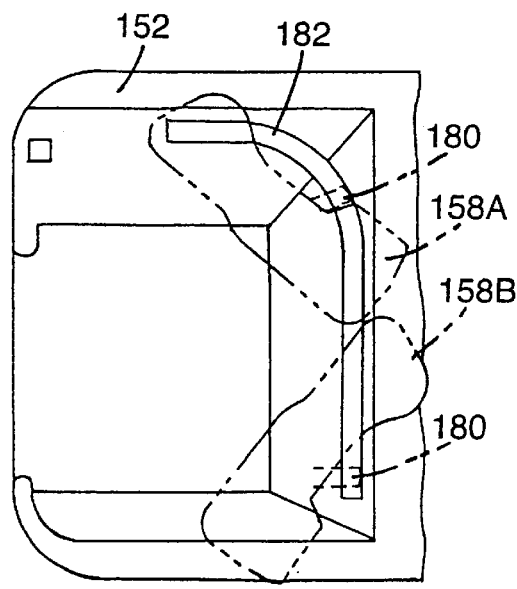
FIG. 7 is another view of the embodiment shown in FIG. 6 illustrating other positions for the control console.
Figure 8:
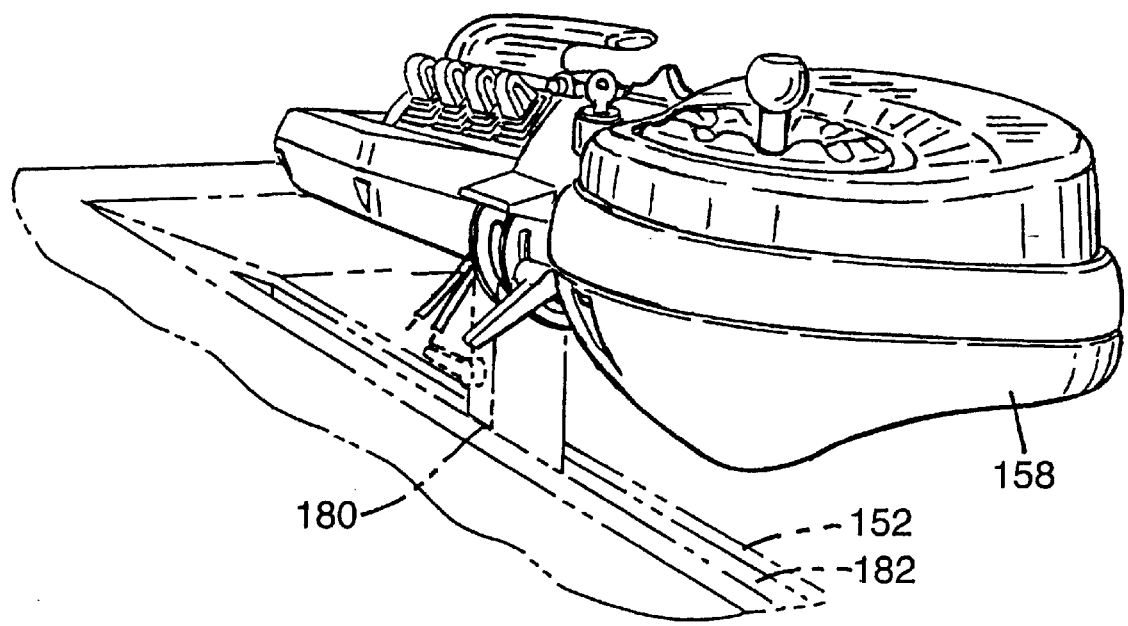
FIG. 8 is a left front perspective view of the second embodiment for attaching the control console.

The body 52 of the material handling vehicle may include other mechanisms for positioning the control console 58 with respect to the body. Referring to FIGS. 6–8, the body 152 includes a slot 182 for the mounting post 180 and the attached control console 158. As shown in FIGS. 6, 7 and 8, the mounting post 180 engages the slot 182. The user is able to release the mounting post 180 from the slot 182 and move the mounting post 180 and the attached control console 158 to a different position in the slot 182. The user may then lock the mounting post 180 into position in the slot 182.

Figure 9:
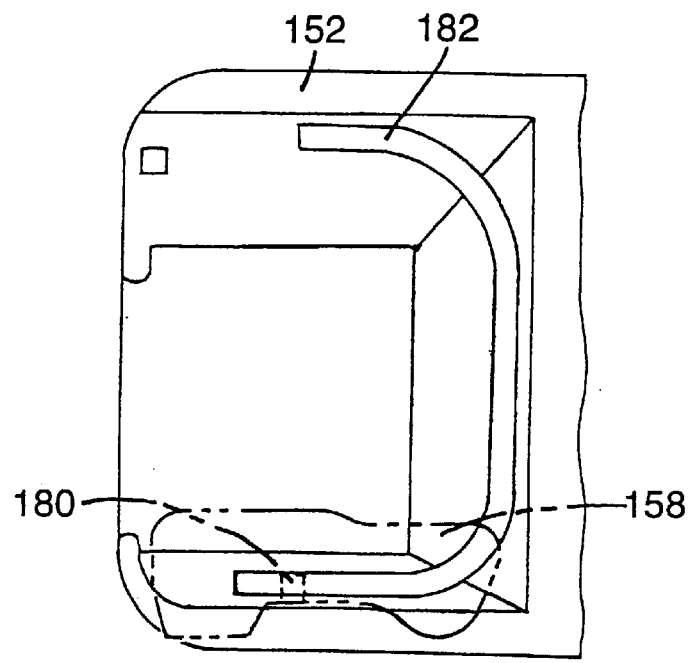
FIG. 9 is a partial cross-sectional view of the material handling vehicle taken along line 9—9 of FIG. 1 showing another embodiment for attaching the control console to the vehicle body and showing the right side position for the control console.

As shown in FIG. 6, the control console may be positioned in the forward position or the left side position. In addition, the control console 158 may be located in any position along the slot 182. For example, the control console 158 may be located in any position between the forward position and the left side position, such as the angle position of control console 158A shown in FIG. 7. In addition, the control console may include the ability to rotate the console relative to the slot 182 and the control console could be placed in the angle position of control console 158B shown in FIG. 7. Furthermore, if desired, the slot 182 may extend along the right side of the body as shown in FIG. 9. Thus, the operator could select any position between the left side position and the right side position.

Figure 10:
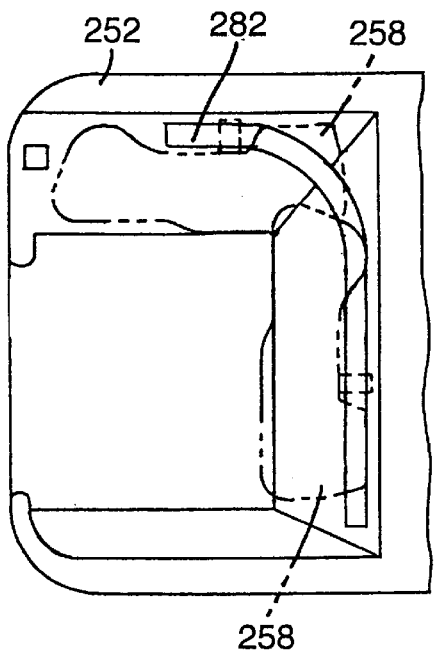
FIG. 10 is a partial cross-sectional view of the material handling vehicle taken along line 10—10 of FIG. 1 showing a third embodiment for attaching the control console to the vehicle body and showing the forward position and the left side position for the control console.
Figure 11:
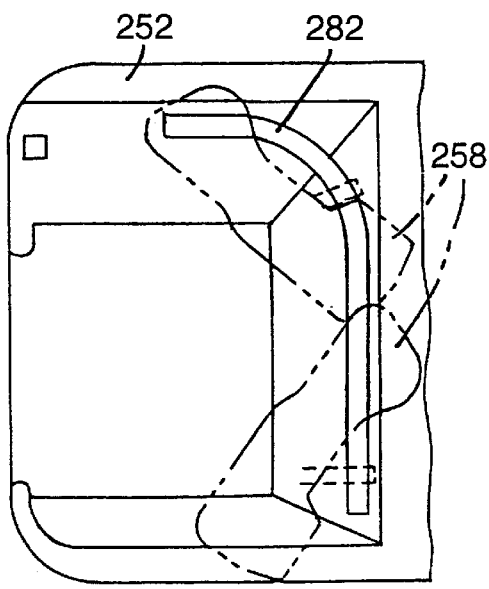
FIG. 11 is another view of the embodiment shown in FIG. 10 illustrating other positions for the control console.
Figure 12:
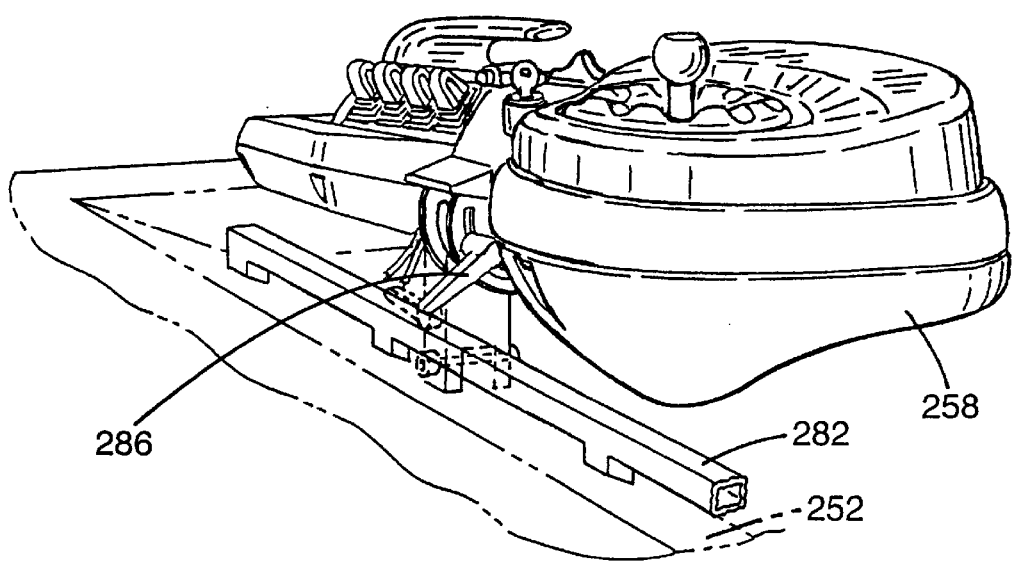
FIG. 12 is a left front perspective view of the third embodiment for attaching the control console.

In another embodiment, the body of the material handling vehicle may include a third mechanism for positioning the control console with respect to the body. Referring to FIGS. 10, 11 and 12, the body 252 includes a curved track or bar 282 for positioning the control console 258 with respect to the body 252. As shown in FIGS. 10, 11 and 12 the control console engages the track 282. The user is able to release the control console 258 from the track 282 and move the control console 258 to a different position on the track 282. The operator may then lock the control console 258 into position on the track 282.

As shown in FIG. 10, the control console may be located in the forward position or the left side position. In addition, the control console 258 may be located in any position along the track 282. For example, the control console 258 may be located in any position between the forward position and the left side position, such as, the angled position shown in FIG. 11. Furthermore, if desired, the track 282 may extend along the right side and the operator could select any position between the left side position and the right side position similar to FIG. 9.

Figure 13:
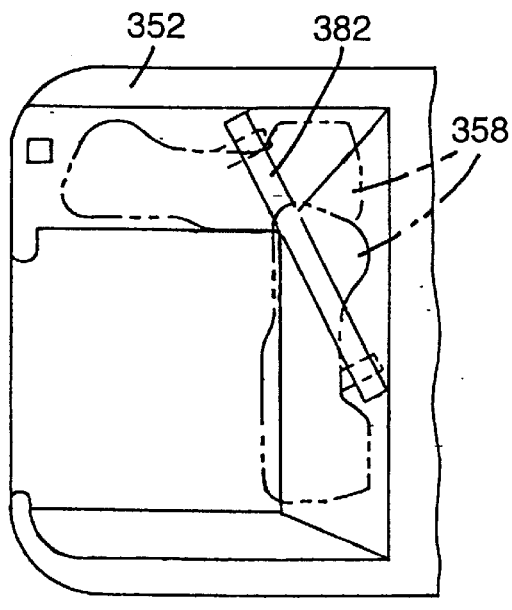
FIG. 13 is a partial cross-sectional view of a material handling vehicle taken along line 13—13 of FIG. 1 showing a fourth embodiment for attaching the control console to the vehicle body and showing the forward position and the left side position for the control console.
Figure 14:
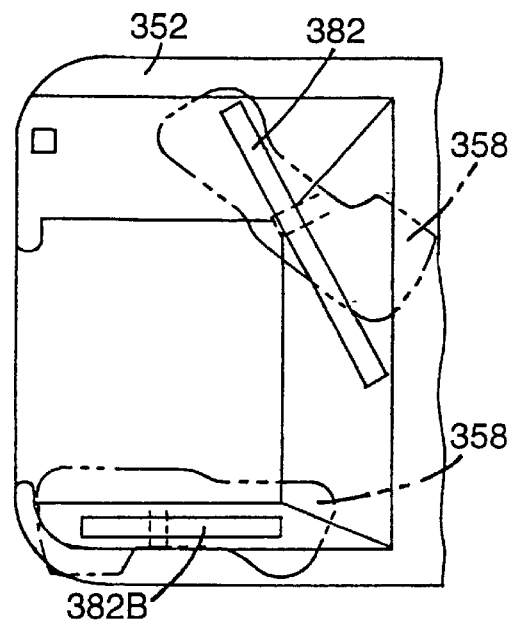
FIG. 14 is a view of another embodiment of the material handling vehicle shown in FIG. 13 with the control console shown in other positions.

In another embodiment, the body of the material handling vehicle may include another mechanism for positioning the control console with respect to the body. Referring to FIGS. 13 and 14, the body includes a straight track or bar 382 for positioning the control console 358 with respect to the body 352. The track 382 is similar to the track 282 illustrated in FIGS. 10–12 except the track 382 is straight versus the curved track 282. As shown in FIGS. 13 and 14, the control console engages the track 382. The user is able to release the control console 358 from the track 382 and move the control console 358 to a different position on the track 382. The user may then lock the control console into position on the track 382. In addition, the control console may include the ability to rotate the control console relative to the track 382.

As shown in FIG. 13, the control console may be positioned in the forward position or the left side position. In addition, the control console 358 may be located in any position along the track 382. For example, the control console 358 may be located in any position between the forward position and the left side position, such as, the angled position shown in FIG. 14. Furthermore, if desired, the track 382 or an additional track 382B may extend along the right side as shown in FIG. 14 and the operator could select any position between the left side position and the right side position.

Figure 15:
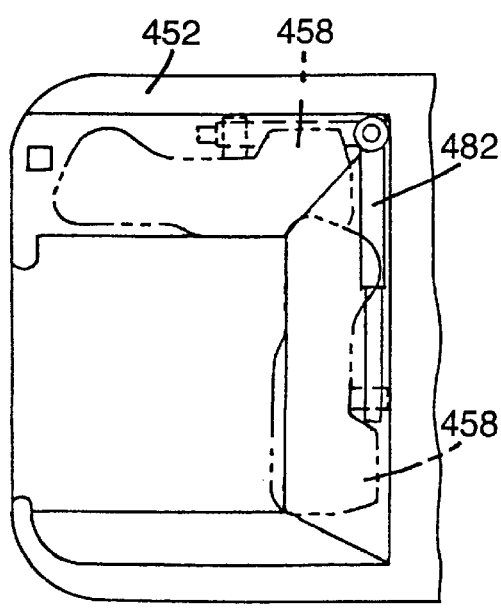
FIG. 15 is a partial cross-sectional view of a material handling vehicle taken along line 15—15 of FIG. 1 showing a fifth embodiment for attaching the control console to the vehicle body and showing the forward position and the left side position for the control console.
Figure 16:
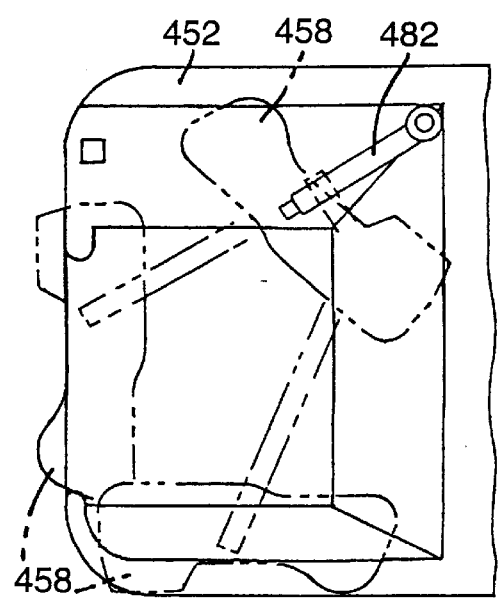
FIG. 16 is another view of the embodiment shown in FIG. 15 with the control console shown in other positions.

In another embodiment, the body of the material handling vehicle may include a fifth mechanism for positioning the control console with respect to the body. Referring to FIGS. 15–16, the body 452 includes a pivoting arm 482 for positioning the control console 458 with respect to the body 452. As shown in FIGS. 15 and 16, the control console 458 engages the pivoting arm 482. The user is able to release the pivoting arm 482 and move the pivoting arm 482 and the attached control console 458 to a different position with respect to the body. The user may then lock the pivoting arm 482 into the desired position. Furthermore, the control console 458 may be able to rotate relative to the pivoting arm 482. In addition, the pivoting arm may include telescoping sections which allow the arm 482 to increase or decrease in length.

Figures 17, 18:
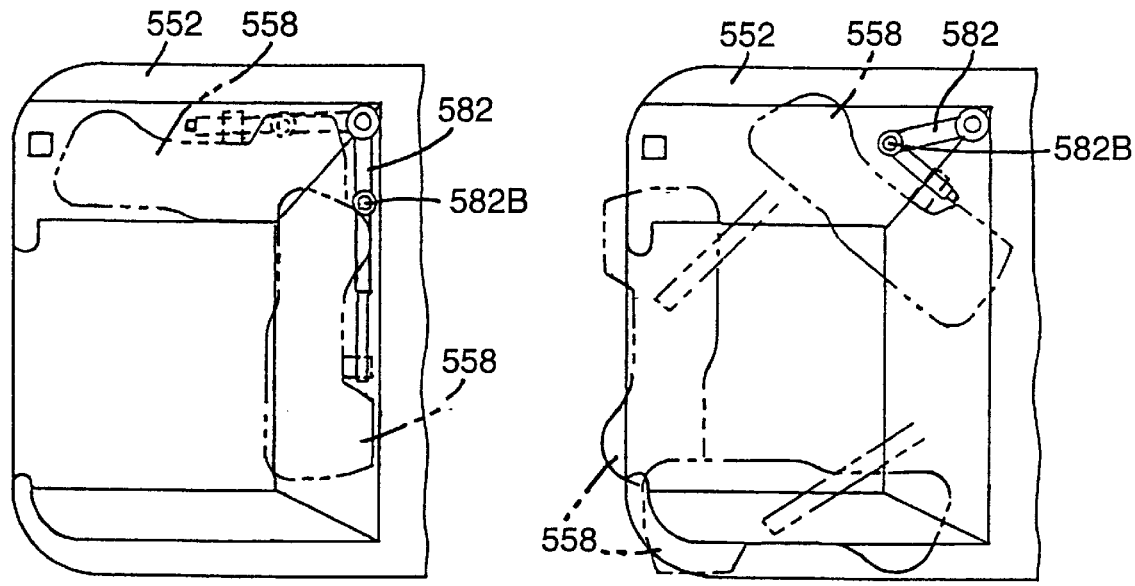
FIG. 17 is a partial cross-sectional view of a material handling vehicle taken along line 17—17 of FIG. 1 showing a sixth embodiment for attaching the control console to the vehicle body and showing the forward position and the left side position for the control console.
FIG. 18 is another view of the embodiment shown in FIG. 17 with the control console shown in other positions.
Figure 19:
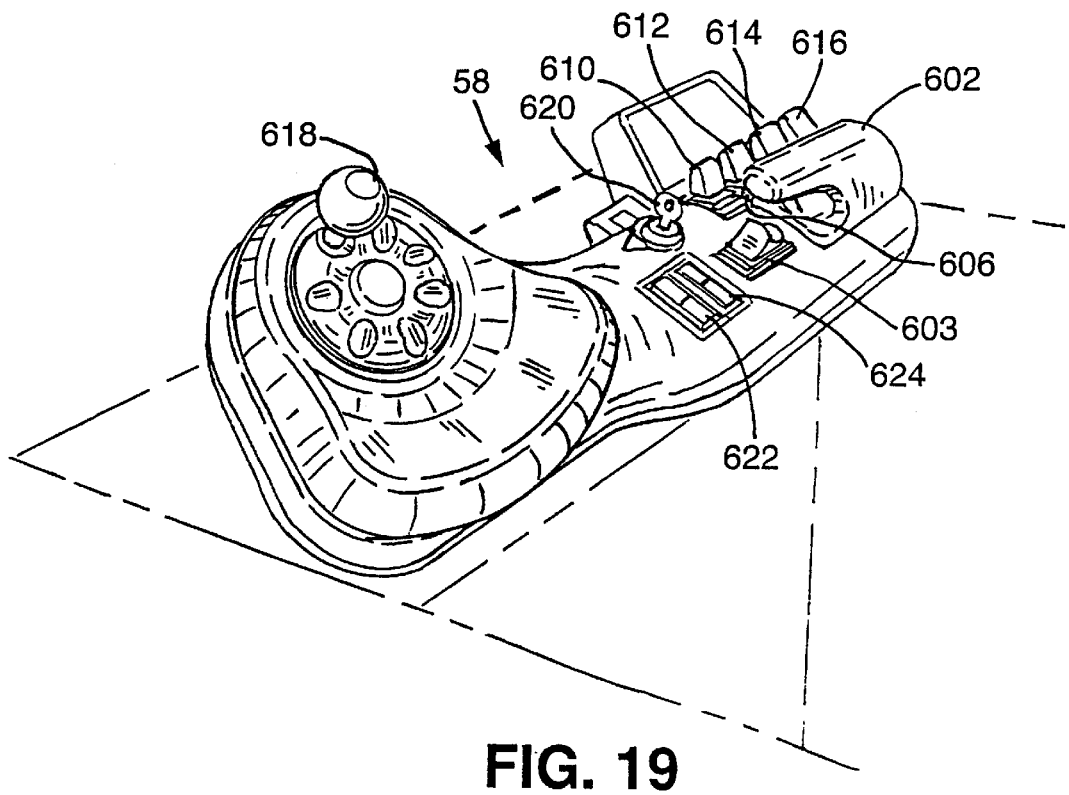
FIG. 19 is a left rear perspective view of the control console in accordance with the teachings of the invention.
Figure 20:
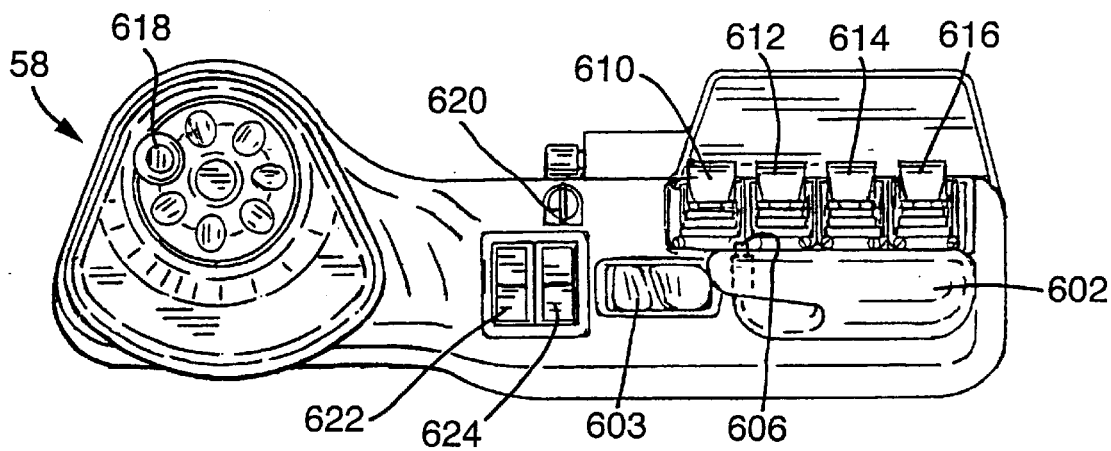
FIG. 20 is a top view of the control console shown in FIG. 19.
Figure 21:
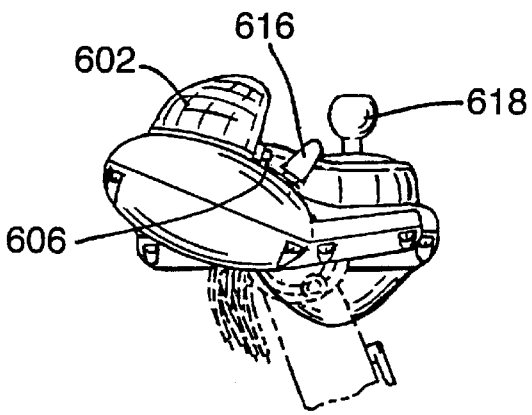
FIG. 21 is a right side view of the control console shown in FIG. 19.
Figure 22:
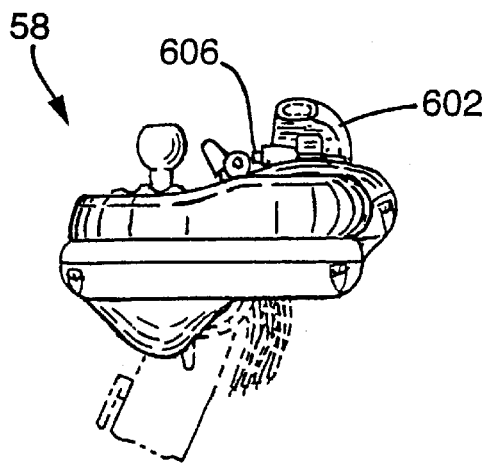
FIG. 22 is a left side view of the control console shown in FIG. 19.
Figure 23:
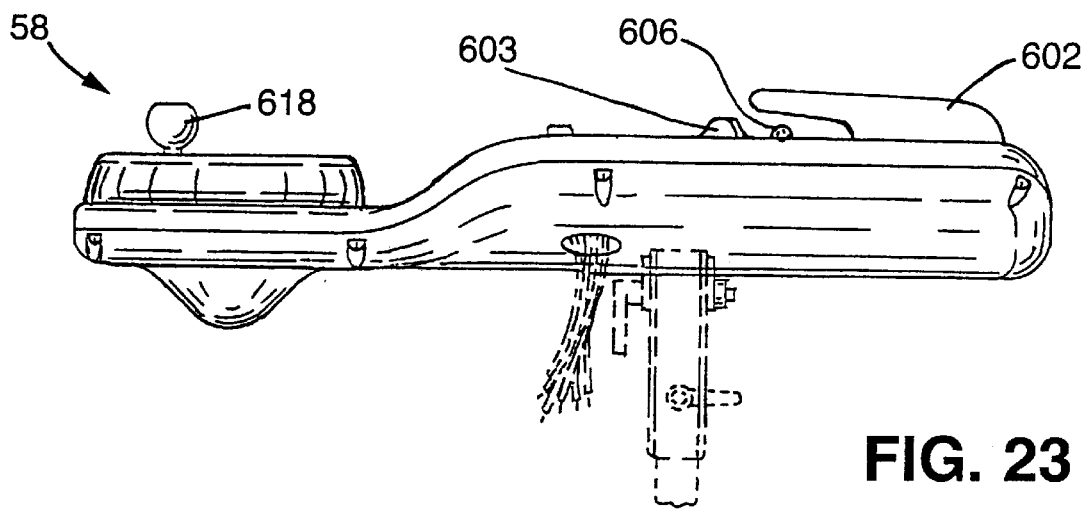
FIG. 23 is a rear view of the control console shown in FIG. 19.
Figure 24:
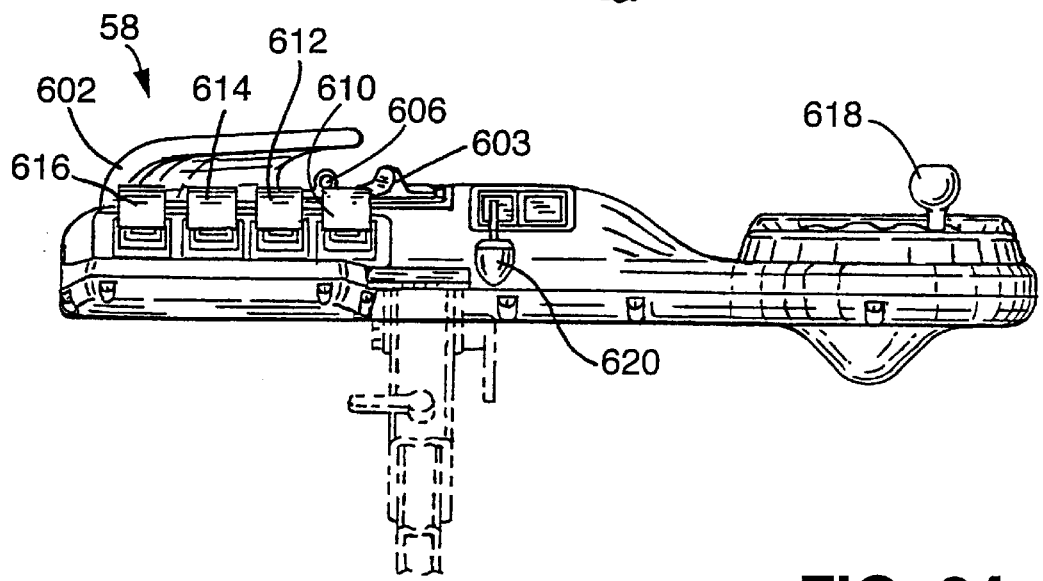
FIG. 24 is a front view of the control console shown in FIG. 19.
Figure 25:
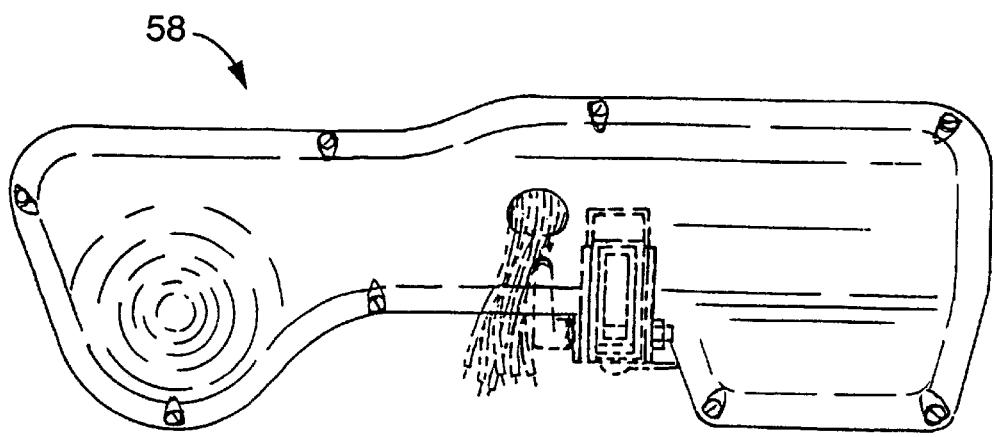
FIG. 25 is a bottom view of the control console shown in FIG. 19.
Figure 26:
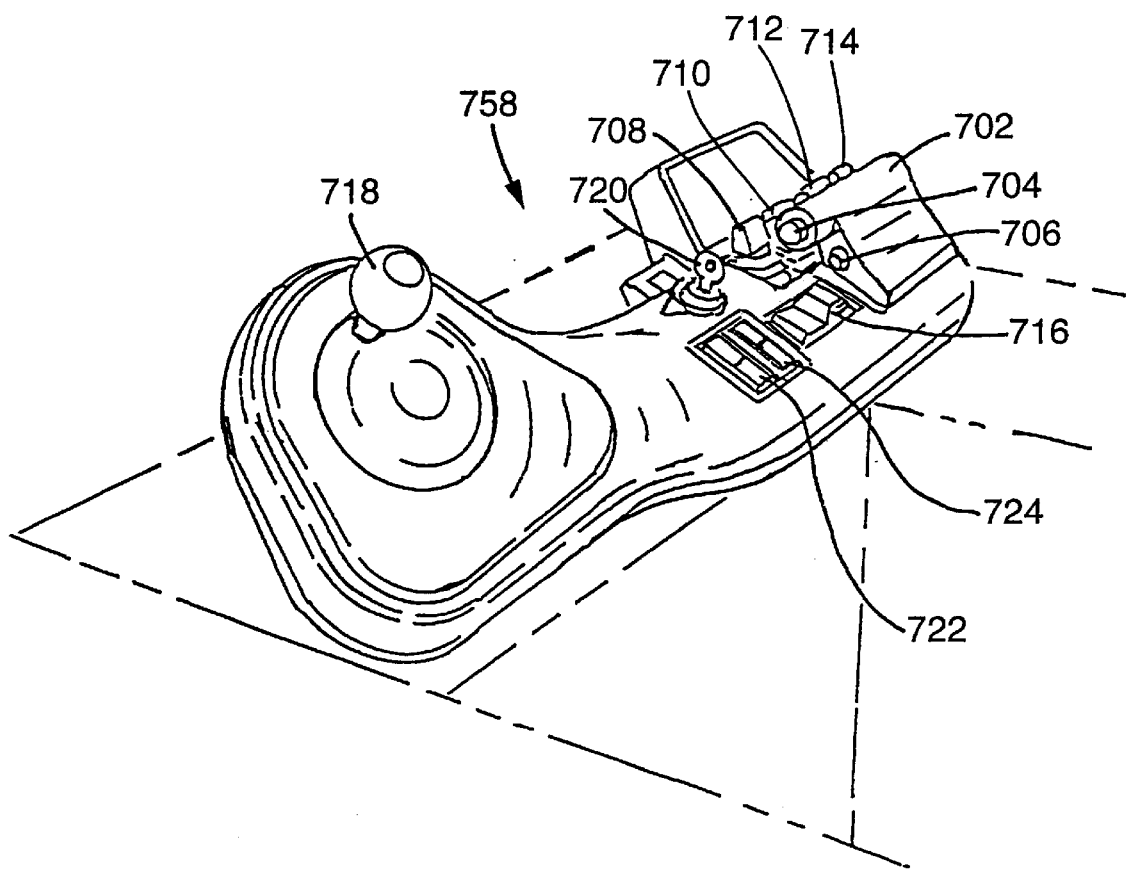
FIG. 26 is a left rear perspective view of another embodiment of the control console in accordance with the teachings of the invention.
Figure 27:
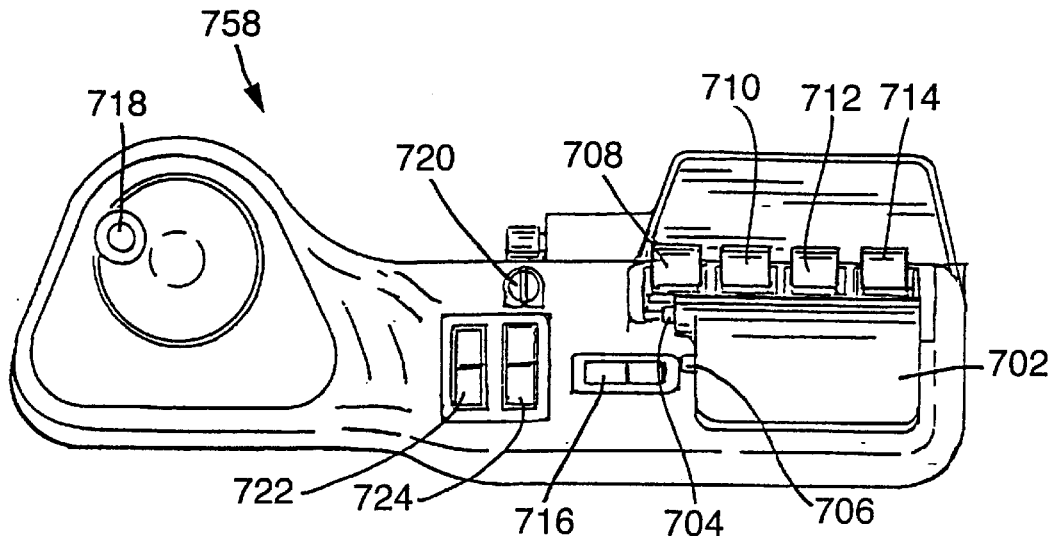
FIG. 27 is a top view of the control console shown in FIG. 26.
Figure 28:
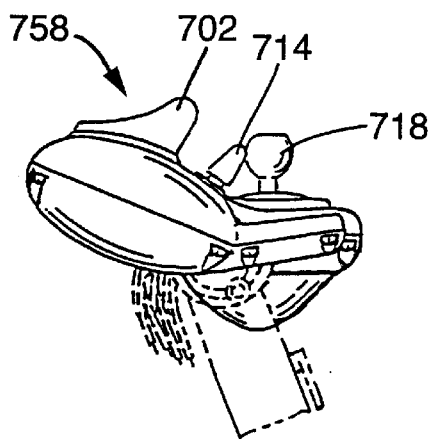
FIG. 28 is a right side view of the control console shown in FIG. 26.
Figure 29:
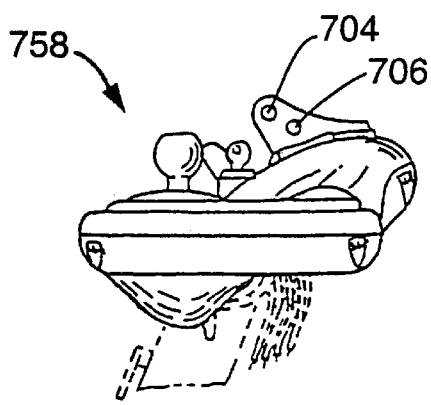
FIG. 29 is a left side view of the control console shown in FIG. 26.
Figure 30:
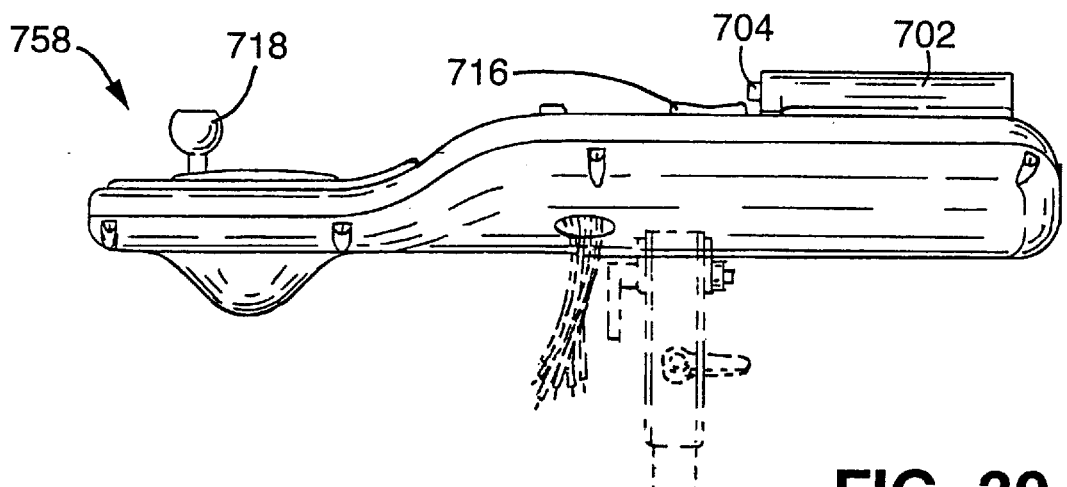
FIG. 30 is a rear view of the control console shown in FIG. 26.
Figure 31:
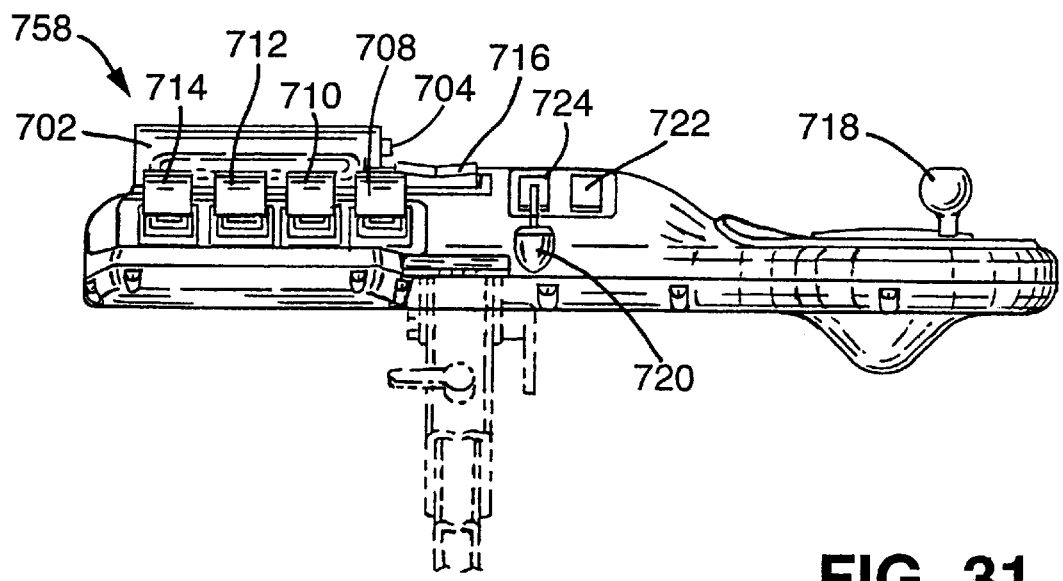
FIG. 31 is a front view of the control console shown in FIG. 26.
Figure 32:
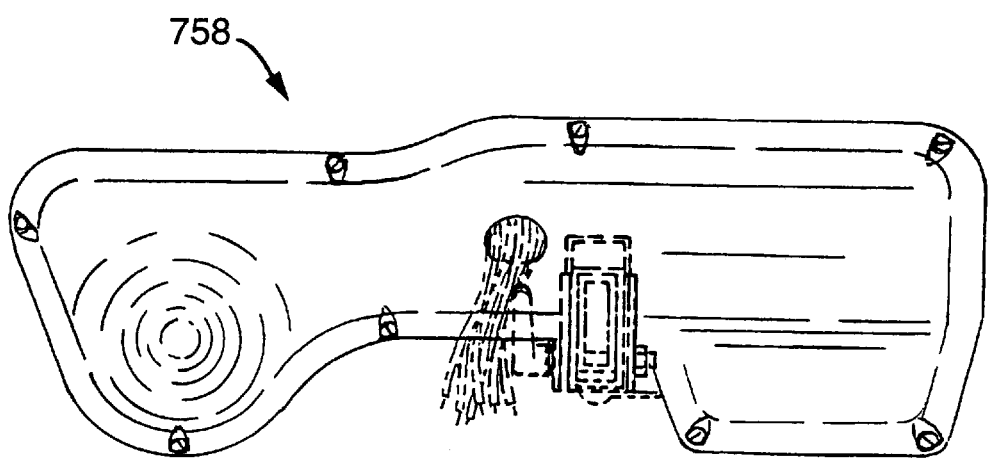
FIG. 32 is a bottom view of the control console shown in FIG. 26.

As shown in FIG. 15, the control console 458 may be positioned in the forward position or the left side position. In addition, the control console 458 may be located in any position within the rotation of the pivoting arm 482. For example, the control console 458 may be located in any position around the operator, such as, the angled position, the right side position or the rear position as shown in FIG. 16. In another embodiment, as shown in FIGS. 17 and 18, the pivoting arm 582 may include an additional pivot point 582B to provide additional convenience in positioning the control console 558 with respect to the body 552.

Referring to FIGS. 19–25, the control console 58 may include various controls for operating the vehicle and a stability support for the operator. Specifically, the control console 58 includes the stability support 602, the direction change and accelerator switch 603, the horn switch 606, the lift switch 610, the reach switch 612, the tilt switch 614, the side shift switch 616, the steering control 618, the ignition switch 620 and auxiliary switches 622, 624. The operator would control the vehicle by placing his or her right hand on the stability support 602 and his or her left hand on the steering control 618. The steering control 618 can be rotated 360° in either direction in order to steer the vehicle. Thus, since the steering control 618 rotates, the steering control 618 may not provide sufficient support if the operator requires stability during operation of the vehicle.

However, the operator is able to maintain stability by holding the stability support 602 with his or her right hand. The stability support is fixed relative to the control console 58. Furthermore, the operator does not need to remove his or her right hand from the stability support 602 in order to operate the various switches. For example, the horn switch 606 is mounted on the stability support 602. Therefore, the operator may manipulate this switch using his or her finger without removing his or her hand from the stability support 602. In addition, the direction change and accelerator switch 603 is located in relatively close proximity to the stability support 602 and the operator may use his or her thumb to operate the switch 603 without removing his or her hand from the stability support 602. Similarly, the switches 610–616 are also located in relatively close proximity to the stability support 602 and the operator may manipulate these switches with his or her fingers without removing his or her hand from the stability support.

The operator may require stability if the vehicle is stopped quickly, operated over a rough surface, operated around corners, accelerated quickly or operated on an incline. If the control console 58 did not include the stability support 602, the operator would need to hold onto to another portion of the control console or the body of the vehicle for stability. Consequently, without the stability support the operator would not be able to maintain stability with his or her right hand and also at the same time operate the controls with his or her right hand.

The direction change and accelerator switch 603 controls the direction in which the vehicle is travelling and controls the speed of the vehicle. When the direction change and accelerator switch 603 is not depressed, the vehicle is at rest. When the direction change and accelerator switch 603 is pulled toward the stability support 602 (e.g., pulled to the right), the vehicle moves in the direction selected by the operator. The vehicle moves faster as the direction change and accelerator switch 603 is moved closer to the stability support 602. When the user releases the direction and accelerator switch 603, the vehicle will travel to a stop.

When the direction and accelerator switch 603 is pushed away from the stability support 602 (e.g., pushed to the left), the vehicle will change the direction in which the vehicle is travelling without the operator turning the vehicle with the steering control 618. For example, if the vehicle is travelling in the forward direction and the operator pushes the direction change and accelerator switch 603 away from the support 602, then the vehicle will change direction and will travel in the opposite direction (i.e. in the rearward direction) without the operator turning the vehicle with the steering control 618. For example, when the operator pushes the direction change and accelerator switch 603 away from the support 602 and then releases the switch 603, the vehicle will: (1) change the direction of the drive motor rotation to the opposite direction (e.g. 180 degrees of the previous direction); (2) travel to a stop; and (3) remain at a stop. If the operator then pulls the switch 603 toward the support, the vehicle will accelerate in the new direction which is 180 degrees of the previous vehicle direction. As another exmaple, if the operator pushes the direction change and accelerator switch 603 away from the support 602 and then pulls the switch 603 toward the support, the vehicle will: (1) change the direction of the drive motor rotation to the opposite direction (e.g. 180 degrees of the previous direction; (2) travel to a stop; and (3) accelerate in the new direction. As noted above, the direction change and accelerator switch 603 is located in close proximity to the stability support 602. Thus, the operator does not need to remove his or her hand from the stability support to operate the direction change and accelerator switch 603.

The horn switch 606 sounds the horn when the operator depresses the switch 606. As noted above, the horn switch 606 is mounted on the stability support 602.

The lift switch 610 controls the height of the lift carriage 68. When the lift switch 610 is not activated, the height of the fork carriage remains at its current height. When the lift switch 610 is pulled toward the stability support 602, the lift carriage is raised upward and stops when the operator releases the switch 610 or when the end of travel is reached. If the lift switch 610 is pushed away from the stability support 602, the fork carriage 68 is lowered and stops when the operator releases the lift switch 610 or when the end of travel is reached.

The reach switch 612 controls the reach mechanism 74. When the reach switch 612 is not activated, the reach mechanism 74 stays in its current position. When the reach switch 612 is pulled toward the stability support 602, the reach mechanism 74 retracts the fork carriage toward the vehicle and stops when the operator releases the reach switch or when the end of travel is reached. When the operator pushes the reach switch 612 away from the stability support 602, the reach mechanism 74 extends the fork carriage 68 away from the vehicle and stops when the operator releases the reach switch or when the end of travel is reached.

The tilt switch 614 controls the tilt of the fork carriage 68. When the tilt switch 614 is not activated, the fork carriage remains at its current angle. When the tilt switch 614 is pulled toward the stability support 602, the fork carriage tilts upward for an uptilt or rearward tilt and stops when the operator releases the tilt switch or when the end of travel is reached. When the tilt switch is pushed away from the stability support 602, the fork carriage tilts downward for a down tilt or forward tilt and stops when the operator releases the tilt switch or when the end of travel is reached.

The side shift switch 616 controls the side shift mechanism. When the side shift switch 616 is not activated, the fork carriage remains in its current position. When the side shift switch 616 is pulled toward the stability support 602, the fork carriage moves to the left and stops when the operator releases the side shift switch or when the end of travel is reached. When the side shift switch 616 is pushed away from the stability support 602, the fork carriage moves to the right and stops when the operator releases side shift switch 616 or when the end of travel is reached.

The auxiliary switches 622 and 624 control other devices, such as, a fan, a reading light, a head light or a backup light.

The location of the stability support and the controls can be modified as necessary. For example, the stability support 602 and the switches 603–616, 620–624 could be located on the left side of the control console 58 and the steering control 618 could be located on the right side of the control console. Thus, the operator would use his or her right hand to steer the vehicle and his or her left hand to hold the stability support and operate the controls. As another example, the controls can be located in different positions and have different operations as in the embodiment shown in FIGS. 26–32.

Another embodiment of the control console is shown in FIGS. 26–32, the control console 758 may include various controls for operating the vehicle and a stability support for the operator. Specifically, the control console 758 includes the stability support 702, the direction change switch 704, the horn switch 706, the accelerator switch 708, the lift switch 710, the reach switch 712, the tilt switch 714, the side shift switch 716, the steering control 718, the ignition switch 720 and auxiliary switches 722, 724. The operator would control the vehicle by placing his or her right hand on the stability support 702 and his or her left hand on the steering control 718. The steering control 718 can be rotated 360° in either direction in order to steer the vehicle. Thus, since the steering control 718 rotates, the steering control 718 may not provide sufficient support if the operator requires stability during operation of the vehicle.

However, the operator is able to maintain stability by holding the stability support 702 with his or her right hand. The stability support is fixed relative to the control console 758. Furthermore, the operator does not need to remove his or her right hand from the stability support 702 in order to operate the various switches. For example, the direction change switch 704 and the horn switch 706 are mounted on the stability support 702. Therefore, the operator may manipulate these switches using his or her thumb without removing his or her hand from the stability support 702. In addition, side shift switch 716 is located in relatively close proximity to the stability support 702 and the operator may use his or her thumb to operate the side shift switch 716 without removing his or her hand from the stability support 702. Similarly, the switches 708–714 are also located in relatively close proximity to the stability support 702 and the operator may manipulate these switches with his or her fingers without removing his or her hand from the stability support.

The operator may require stability if the vehicle is stopped quickly, operated over a rough surface, operated around corners, accelerated quickly, or operated on an incline. If the control console 758 did not include the stability support 702, the operator would need to hold onto to another portion of the control console or the body of the vehicle for stability. Consequently, without the stability support the operator would not be able to maintain stability with his or her right hand and also at the same time operate the controls with his or her right hand.

The direction change switch 704 controls the direction in which the vehicle is travelling. If the vehicle is travelling in the forward direction and the operator presses the direction change switch 704, then the vehicle will change direction and will travel in the opposite direction (i.e. in the rearward direction) without the operator turning the vehicle with the steering control 718. For example, when the operator depresses the direction change switch 704 and releases the switch 704, the vehicle will: (1) change the direction of the drive motor rotation to the opposite direction (i.e. 180 degrees of the previous direction); (2) travel to a stop; and (3) remain at a stop. If the operator then pulls the accelerator switch 708 toward the support, the vehicle will accelerate in the new direction which is 180 degrees of the previous vehicle direction. As another example, if the operator pushes the direction change switch 704 with his or her thumb and simultaneously continues to pull the accelerator switch 708 with his or her finger, then the vehicle will: (1) change the direction of the drive motor rotation to the opposite direction (i.e. 180 degrees of the previous direction); (2) travel to a stop; and (3) accelerate in the new direction.

The horn switch 706 sounds the horn when the operator depresses the switch 706. As noted above, the direction change switch 704 and the horn switch 706 are mounted on the stability support 702.

The accelerator switch 708 controls the speed of the vehicle. When the accelerator switch 708 is not depressed, the vehicle is at rest. When the accelerator switch 708 is pulled toward the stability support 702, the vehicle moves in the direction selected by the operator. The vehicle moves faster as the accelerator switch 708 is moved closer to the stability support 702. When the, user releases the accelerator switch 708, the vehicle will travel to a stop.

The lift switch 710 controls the height of the lift carriage 68. When the lift switch 710 is not activated, the height of the fork carriage remains at its current height. When the lift switch 710 is pulled toward the stability support 702, the lift carriage is raised upward and stops when the operator releases the switch 710 or when the end of travel is reached. If the lift switch 710 is pushed away from the stability support 702, the fork carriage 68 is lowered and stops when the operator releases the lift switch 710 or when the end of travel is reached.

The reach switch 712 controls the reach mechanism 74. When the reach switch 712 is not activated, the reach mechanism 74 stays in its current position. When the reach switch 712 is pulled toward the stability support 702, the reach mechanism 74 retracts the fork carriage toward the vehicle and stops when the operator releases the reach switch or when the end of travel is reached. When the operator pushes the reach switch 712 away from the stability support 702, the reach mechanism 74 extends the fork carriage 68 away from the vehicle and stops when the operator releases the reach switch or when the end of travel is reached.

The tilt switch 714 controls the tilt of the fork carriage 68. When the tilt switch 714 is not activated, the fork carriage remains at its current angle. When the tilt switch 714 is pulled toward the stability support 702, the fork carriage tilts upward for an uptilt or rearward tilt and stops when the operator releases the tilt switch or when the end of travel is reached. When the tilt switch is pushed away from the stability support 702, the fork carriage tilts downward for a down tilt or forward tilt and stops when the operator releases the tilt switch or when the end of travel is reached.

The side shift switch 716 controls the side shift mechanism. When the side shift switch 716 is not activated, the fork carriage remains in its current position. When the side shift switch 716 is depressed on the left side, the fork carriage moves to the left and stops when the operator releases the side shift switch or when the end of travel is reached. When the side shift switch 716 is depressed on the right side, the fork carriage moves to the right and stops when the operator releases side shift switch 716 or when the end of travel is reached.

The auxiliary switches 722, 724 control other devices, such as, a fan, a reading light, a head light or a backup light.

As noted above, the location of the stability support and the controls can be modified as necessary. For example, the stability support 702 and the switches 704–716, 720–724 could be located on the left side of the control console 758 and the steering control 718 could be located on the right side of the control console. Thus, the operator would use his or her right hand to steer the vehicle and his or her left hand to hold the stability support and operate the controls.

Thus, the invention provides a material handling vehicle with a control console which can be located in a different position by the user. In addition, the invention provides a control console which provides stability support and also permits the user to operate the controls while holding the support.

While particular embodiments of the invention have been shown, it will be understood, of course, that the invention is not limited thereto. On the contrary, we intend to cover all alternatives, modifications and equivalents as may be included within the scope and spirit of the invention as defined by the appended claims.

What is claimed is:

1. A material handling vehicle for transporting loads comprising a vehicle body, a lifting portion connected to said vehicle body, a control console connected to said vehicle body, an operator area on said vehicle body, said control console including a control for operating said vehicle and said control console including a stability support for stabilizing an operator, said stability support having a support surface, said control is located in close proximity to said stability support, and an operator can operate said control with one of the digits of a hand while the same hand can grip with said support surface on said stability support.

2. The invention as in claim 1 wherein a hand is a right hand.

3. The invention as in claim 1 wherein said control is operated with a finger or a thumb.

4. The invention as in claim 1 wherein said control is selected from the group consisting of a change direction and accelerator switch, an accelerator switch, a lift switch, a reach switch, a tilt switch and a side shift switch.

5. The invention as in claim 1 wherein said stability support extends upward from said control panel.

6. The invention as in claim 1 wherein said control console includes a rotary steering control.

7. The invention as in claim 1 wherein a hand is a left hand.

8. The invention as in claim 1 wherein said control is located on said stability support.

9. The invention as in claim 8 wherein said control is operated by a finger.

10. The invention as in claim 8 wherein said control is operated by a thumb.

11. The invention as in claim 8 wherein said control is selected from the group consisting of a change direction switch and a horn switch.

* * * * *